Patented Feb. 26, 1929.

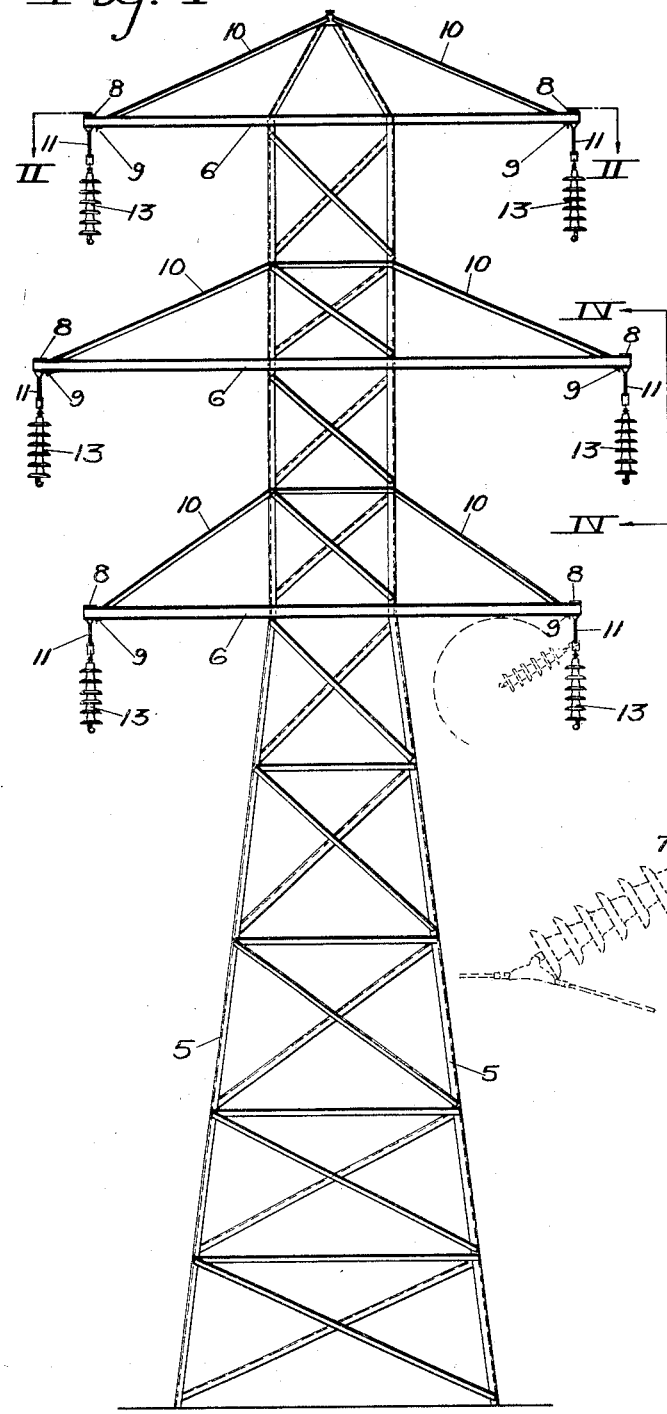
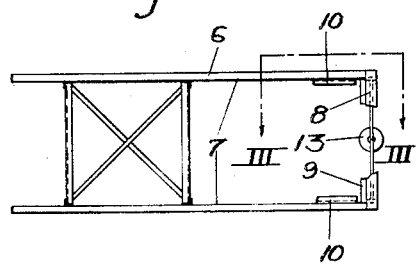
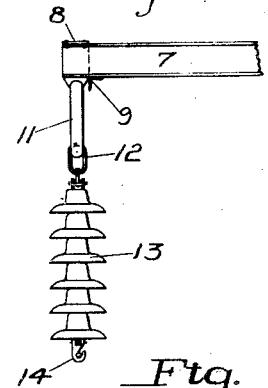
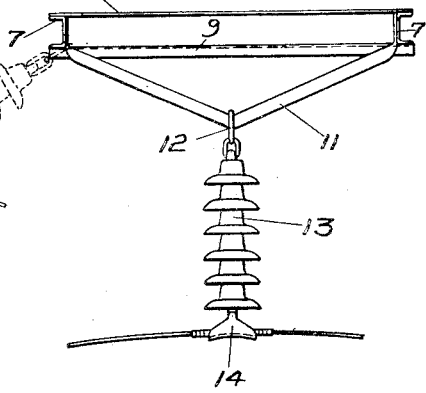

1,703,797

UNITED STATES PATENT OFFICE.

THEODORE VARNEY, OF SEWICKLEY, AND MAXWELL E. NOYES, OF DORMONT, PENNSYLVANIA, ASSIGNORS TO ALUMINUM COMPANY OF AMERICA, OF PITTSBURGH, PENNSYLVANIA, A CORPORATION OF PENNSYLVANIA.

POWER-TRANSMISSION LINE.

Application filed March 12, 1923. Serial No. 624,322.

This invention relates to high voltage transmission lines, and more particularly to an insulator suspension for such lines.

In high tension transmission lines, four types of towers are generally used. The first is the so-called dead-end tower which is designed to resist all the tension which may be put on the cables in the direction of their length, and capable of resisting all strains due to temperature and weather conditions. The second type is known as the semi-anchor tower. This tower is used at intervals in a straight line for resisting any unbalanced longitudinal stresses on the cables. Relatively few of these need be used, and they too can be designed to meet all conditions of strain put upon them. The third type is the angle tower, designed to resist sidewise stresses due to a change in the direction of the line. As a line is designed to be as straight as possible, relatively few such towers are necessary and these are also designed to meet all the loads to which they may be subject.

The great majority of the towers, however, are the suspension towers used for supporting the cables on the straight-away stretches. These towers are like the other three types of towers, generally made of structural metal. The cables are suspended from cross arms thereon by means of insulators hung from the cross arm and clamped to the cable. These insulators generally comprise a series or chain of porcelain disks.

The cable is hung from the towers in such manner that the longitudinal stresses on oppositely extending spans shall be equalized as much as possible, thereby minimizing the load on the tower. Due to a variety of causes, the balance or equalization may be destroyed and the tower and other spans of cable subjected to severe stresses and vibration. Because of the great number of suspension towers in a line, the cost of making them sufficiently strong to withstand all conceivable shocks and loads might be prohibitive.

If, for instance, one of the cables is broken, heavy unequal stresses are put on the towers. Also, when an ice or a sleet storm occurs, one span of wire may become more heavily loaded with ice than another, setting up vastly unequal stress. A more series condition arises when the ice suddenly breaks off and falls from one span before it falls from adjacent ones. The loaded spans pull the insulators with a jerk, setting up tremendous vibrations and stresses. Furthermore, the sag thus produced may bring wires of opposite potential into such close proximity as to allow the current to arc across them, burning out one or both of the lines, subjecting the tower to greater strain.

The present invention has for its principal object to provide some connection between the cable and the tower, by means of which any excessive longitudinal stresses produced on a cable suspended from a tower may be substantially equalized or reduced within safe limits.

Another object of the present invention is to provide a construction having the necessary clearance between the cable and cross-arm when the insulator string is deflected toward the tower at an angle of more than forty-five degrees with the vertical.

The invention may be readily understood by reference to the accompanying drawing, in which:

Fig. 1 is a front elevation of a tower embodying our invention:

Fig. 2 is a section in the plane of line II—II of Fig. 1, one side of one of the cross arms being broken away, the view showing a top plan view of one of the arms;

Fig. 3 is a side elevation of the end of the cross arm of Fig. 2, but on a larger scale, line III—III of Fig. 2 indicating the plane of the figure;

Fig. 4 is an end view on a larger scale of one of the cross arms, as indicated by the line IV—IV of Fig. 1.

In the drawing, a tower of a common type is illustrated, having legs 5 which are suitably braced, as indicated. The upper portion of the tower carries a series of cross arms, indicated generally as 6. These cross arms, which are of a structural metal, are preferably formed of two parallel channel or angle irons 7 secured to opposite faces of the tower. As shown in Fig. 2, the outer ends of the cross arms are as wide as the width of the tower in the direction of the line. Connecting the outer ends of the arms is an upper cross strip 8 and a lower angle bar 9. The cross arms are braced by truss members 10.

Secured to the outer ends of the two channels which form a cross arm is a bar or runway 11, which is preferably bowed downwardly, so that the central point is lower than the ends. Carried on this bar is a slidable link 12, from which the insulator 13 is hung. The lower end of the insulator carries a clamp 14 for securely clamping the cable.

By reason of the cross arm being as wide as the tower in the direction of the line, the link 12 has a relatively long distance which it may travel from the center of its bar to the ends thereof.

With the insulator thus suspended, if the cable breaks or the tension in opposite directions becomes unbalanced, the insulator would be pulled over with the link 12 sliding along the runway, at the same time rising vertically a slight extent until it reached the position shown in dotted lines in Fig. 4. The result of this action will be to throw a very considerable additional length of cable into the span on the side of the greater tension, and thereby reduce the tension in that span to a considerable extent, and relieving the tower of a great deal of strain.

If the unbalanced condition is due to some temporary or transient cause, such, for instance, as by the falling of ice from one span, the link 12 and the insulator will automatically return to normal position when the effect of such condition has passed off.

In Fig. 1, one of the insulators is shown in a dotted line position corresponding to the position to which it might be swung under certain circumstances, such as under heavy wind pressure. After the insulator of any tower has been swung inwardly beyond an angle of forty-five degrees, it rapidly approaches closer and closer to the cross arm. A certain critical clearance must, therefore, be maintained between the cross-arm and the rear horizontal position to which the insulator may be swung. By the provision of the insulator supporting member 11 extending below the cross-arm, such critical clearance is obtained, and the usual depending bracket heretofore frequently necessary may be eliminated.

It will be understood, however, that our invention is not necessarily limited to so arranging the member 11 that such clearance is always obtained.

Various changes and modifications may be made in the construction and arrangement of parts within the contemplation of our invention and within the scope of the appended claims.

We claim as our invention:

1. In a power transmission line, a tower, a cable, a suspended insulator string carrying the cable, and a runway extending in the direction of the line and attached to the tower for supporting the string, said runway having an inclined portion, said string slidably mounted on the runway and movable on the inclined portion with the cable in the direction of the line under an unbalanced cable tension.

2. In a power transmission line, a tower, a cable, a suspended insulator string carrying the cable, a cross-arm, and means for supporting the string suspended from the cross-arm, said string slidably mounted on the supporting means and movable thereon with the cable in the direction of the line under an unbalanced cable tension, said supporting means including a runway extending in the direction of the line and having an inclined portion on which the string travels, said runway disposed below the cross-arm a sufficient distance to maintain a critical clearance between the insulator string and the cross-arm.

3. In a power transmission line, a tower, a cable, a suspension type insulator string carrying the cable, means for supporting the string and effecting an inclined upward movement of the string under an unbalanced cable tension including a bowed runway suspended from the tower and extending in the direction of the line, and a member connecting the string and slidably mounted on the runway.

4. In a power transmission line, a tower, a cable, a suspended insulator string carrying the cable, and means for supporting the string, said supporting means including a runway supported from the tower and having depressed portion and inclined portions leading in opposite directions therefrom, said string slidably mounted on the runway and movable thereon with the cable in the direction of the line under an unbalanced cable tension.

5. In a power transmission line, a tower, a cable, a cross-arm, a suspended insulator string carrying the cable, a runway extending in the direction of the line for supporting the string suspended from the cross-arm and including an inclined portion, said string slidably mounted on the runway and movable thereon with the cable in the direction of the line under an unbalanced cable tension.

6. In a power transmission line, a tower, a cross member connected at its opposite ends with a part of the tower and extending in the same direction as the line, said cross member being bowed downwardly so that its lowest point is intermediate the ends thereof, and a cable supporting member freely movable along the cross member.

7. In a power transmission line, a tower, a cross arm on the tower formed of spaced apart parallel bars, a downwardly bowed member having its opposite ends connected with the cross bars, said member extending in the direction of the line, a member slidably carried on the bowed member having cable engaging means thereon.

In testimony whereof we affix our signatures.

THEODORE VARNEY.
MAXWELL E. NOYES.